United States Patent [19]

Anderson

[11] Patent Number: 6,161,177
[45] Date of Patent: *Dec. 12, 2000

[54] METHOD FOR SELECTING, DETECTING AND/OR REPROGRAMMING SYSTEM BIOS IN A COMPUTER SYSTEM

[75] Inventor: Eric D. Anderson, Hudson, Wis.

[73] Assignee: Micron Electronics, Inc., Nampa, Id.

[*] Notice: This patent is subject to a terminal disclaimer.

[21] Appl. No.: 08/944,601

[22] Filed: Oct. 6, 1997

Related U.S. Application Data

[63] Continuation of application No. 08/738,572, Oct. 28, 1996, Pat. No. 6,003,130.

[51] Int. Cl.$^7$ ........................................................ G06F 9/44
[52] U.S. Cl. ............................................... 713/2; 713/1
[58] Field of Search ................................ 713/1, 2, 100

[56] References Cited

U.S. PATENT DOCUMENTS

| | | | |
|---|---|---|---|
| 5,355,489 | 10/1994 | Bealkowski et al. | 395/700 |
| 5,522,076 | 5/1996 | Dewa et al. | 395/700 |
| 5,694,583 | 12/1997 | Williams et al. | 395/500 |
| 5,694,600 | 12/1997 | Khenson et al. | 395/652 |
| 5,768,568 | 6/1998 | Inui et al. | 395/500 |
| 6,003,130 | 12/1999 | Anderson | 713/2 |

*Primary Examiner*—Dennis M. Butler
*Attorney, Agent, or Firm*—Dorsey & Whitney LLP

[57] ABSTRACT

A computer system having a motherboard that is adapted to receive a daughterboard containing a CPU coupled to a PCI bus and a memory device through a system controller. The PCI bus is, in turn, coupled to a storage device, such as a programmable array logic device, containing CPU data identifying the type of CPU or other hardware installed on the daughterboard. The motherboard includes a memory device storing a BIOS program as well as a startup program. The startup program is executed by the CPU at power up or reset to cause the CPU to compare the CPU data identifying the CPU to BIOS data identifying the CPU adapted to execute the BIOS program. In the event that the CPU data and the BIOS data match, the CPU executes the BIOS program in a normal manner. In the event the CPU data does not match the BIOS data, the CPU executes a crisis recovery routine which may involve writing the proper BIOS program from a floppy disk to a programmable memory device containing the BIOS program on the motherboard. The CPU can then execute the proper BIOS program from the programmable memory.

13 Claims, 4 Drawing Sheets

METHOD FOR SELECTING, DETECTING AND/OR REPROGRAMMING SYSTEM BIOS IN A COMPUTER SYSTEM

CROSS-REFERENCE TO RELATED APPLICATION

This application is a continuation of U.S. patent application Ser. No. 08/738,572, filed Oct. 28, 1996, now U.S. Pat. No. 6,003,130.

TECHNICAL FIELD

This invention relates to a method of operating computer systems, and more particularly to a method for verifying that a selected system BIOS is the correct BIOS for the computer system, for selecting the correct BIOS from among multiple BIOS programs, and for reprogramming a storage device with the correct BIOS if the correct BIOS is not present in the computer system.

BACKGROUND OF THE INVENTION

Personal computer systems are today in widespread use. The basic architecture of such computer systems has evolved into a relatively common design illustrated in FIG. 1. More specifically, personal computer systems 10, as illustrated in FIG. 1, include a central processing unit ("CPU") 12, which may be a microprocessor such as an Intel Pentium® microprocessor. The CPU 12 is connected to a system controller 14 through a CPU bus which normally includes a data bus, an address bus, and a control and status bus. The system controller 14 couples the CPU 12 to a system memory, such as a dynamic random access memory ("DRAM") 16. Typically, the system controller is coupled to the DRAM 16 through various addressing and control lines. A data bus of the DRAM 16 is connected directly to the data bus of the CPU bus 16. However, other configurations may also be used.

The system controller 14 also couples the CPU bus 16 to a relatively high speed bus, such as a peripheral component interconnect ("PCI") bus 20. The PCI bus 20 is coupled to various peripheral devices, such as a hard disk 22 and a network interface device 24, which may be a local area network ("LAN") card. The PCI bus 20 may also be coupled to other peripheral devices which are not shown in FIG. 1 for purposes of brevity and clarity.

The PCI bus 20 is also coupled through a PCI/ISA bus bridge 30 to a relatively low speed bus, such as an industry standard architecture (ISA) bus 32. The ISA bus 32 is coupled to a wide variety of peripheral devices, such as a floppy disk drive 33, a keyboard 34, a mouse 36, a modem 38, a video card 40, and a programmable read-only memory ("PROM") 42. The video card 40 is, in turn, connected to a display 46, such as a cathode ray tube ("CRT") monitor.

As with the PCI bus 20, a wide variety of other peripheral devices may be connected to the ISA bus 32. Also, peripheral devices connected to the ISA bus 32, such as the modem 38 and the PROM 42, may be instead connected to the PCI bus 20. Finally, other components typically used in personal computer systems 10, such as cache static RAM ("SRAM") memory, interrupt handlers, and various control circuitry for the CPU 12, have been omitted for purposes of clarity and brevity.

In operation, when power is initially applied to the computer system 10, the CPU 12 accesses a specific memory address in the address space of the PROM 42. The CPU 12 then starts executing a basic input/output system ("BIOS") program stored in the PROM 42. The BIOS program stored in the PROM 42 causes the CPU 12 to execute a power-on self test ("POST") program and to then load an operating system that is typically stored on the hard disk 22. Once the operating system has been executed by the CPU 12 and stored in the system memory 18, the CPU 12 can execute various application programs, as well known to one skilled in the art.

In practice, the architecture of the computer system raises several issues concerning the selection and/or execution of the BIOS program. For example, the computer system chip set, including all of the components shown in FIG. 1, are generally mounted on a motherboard, although individual components, such as the CPU 12, may be individually removable from the motherboard (not shown). However, since the PROM 42 and CPU 12 are mounted on a common motherboard, the BIOS program stored in the PROM 42 is assuredly the correct BIOS program for the chip set, including the particular CPU 12 included in the chip set. The computer system 10 shown in FIG. 1 might not operate satisfactorily if the CPU 12 or other chip set component was replaced with a variety of CPU's or other chip set components that did not correspond to the particular BIOS program stored in the PROM 42. In particular, the BIOS program stored in the PROM 42 may not be the correct BIOS program for the CPU 12 or the correct BIOS program for other components of the chip set. As a result, to the extent that CPUs 12 or other chip set components have been removable from motherboards, they generally may be replaced by only the same type of CPU or chip set component so that they will properly function with the particular BIOS program stored on a PROM 42 or similar device on the motherboard. However, it would be desirable to be able to use different CPUs 12 or other chip set components on a common motherboard for a variety of reasons. For example, it would be desirable to allow different CPUs 12 or other chip set components to be placed on a common motherboard to specially adapt the computer system 10 to various uses. Also, it would be desirable to allow a different CPU 12 or other chip set component to be placed on the motherboard to upgrade the computer system 10 as new devices became available. Unfortunately, if the BIOS program is stored in a memory device mounted on the motherboard, there is no way to ensure correspondency between the BIOS program and the new CPU or other chip set components. It would therefore be desirable to allow various CPUs or other chip set components to be installed on a motherboard even though the BIOS for the CPU or other chip set component is contained in a memory device that remains installed on the motherboard.

Another issue raised by the architecture of computer systems is ensuring that the proper BIOS program is executed in computer systems having more than one BIOS program retained in a storage device. For example, the computer system may have several BIOS programs retained in a storage device, yet the CPU may be capable on executing only one of the BIOS programs, or the BIOS program may be specially adapted for optimum performance with a specific chip set. Under these circumstances, it is necessary to verify that the proper BIOS program has been selected for execution, and, if not, either select a different BIOS program or input the proper BIOS program into the computer system. However, computer system have heretofore not accomplished these functions.

SUMMARY OF THE INVENTION

The inventive method controls the operation of a computer system that includes a central processing unit ("CPU"), and it may also include other chip set components such as a storage device containing hardware data identifying the CPU or other chip set components. The computer system also includes a memory device containing a basic input/output system ("BIOS") program and BIOS identifying data specifying the CPU or other chip set components corresponding to the BIOS program, i.e., the CPU that the BIOS program was designed to be executed by or the chip set components that the BIOS program was designed to operate with. In accordance with method, the hardware data from the storage device and the BIOS identifying data is read from the memory device. The hardware data is then compared to the BIOS identifying data and, in the event that the hardware data and the BIOS identifying data do not correspond to the same CPU or other chip set components, another BIOS program (if more than one is stored in the computer system) is selected or crisis recovery routine procedure is performed. In accordance with the crisis recovery procedure, a user inserts a disk containing the correct BIOS program into a disk drive so that the correct BIOS program can be transferred to programmable memory in the computer system. Rather than comparing stored hardware data with the BIOS identifying data, the BIOS identifying data is recorded corresponding to the BIOS program that was last executed by the CPU. The stored hardware data is then compared with the recorded BIOS identifying data.

The ability to verify that the correct BIOS program is to be executed by the CPU and, if not, to take corrective action, allows a chip set containing the CPU and other components to be mounted on a daughterboard that removably plugs into a motherboard containing the remaining components of the computer system. The memory device containing the BIOS program is preferably programmable so that it may be reprogrammed as a function of the specific CPU or other hardware installed in the daughterboard. The memory device may also contain several different BIOS programs, one of which is selected by the startup program as determined by the CPU data.

DETAILED DESCRIPTION OF THE INVENTION

Figure 1:
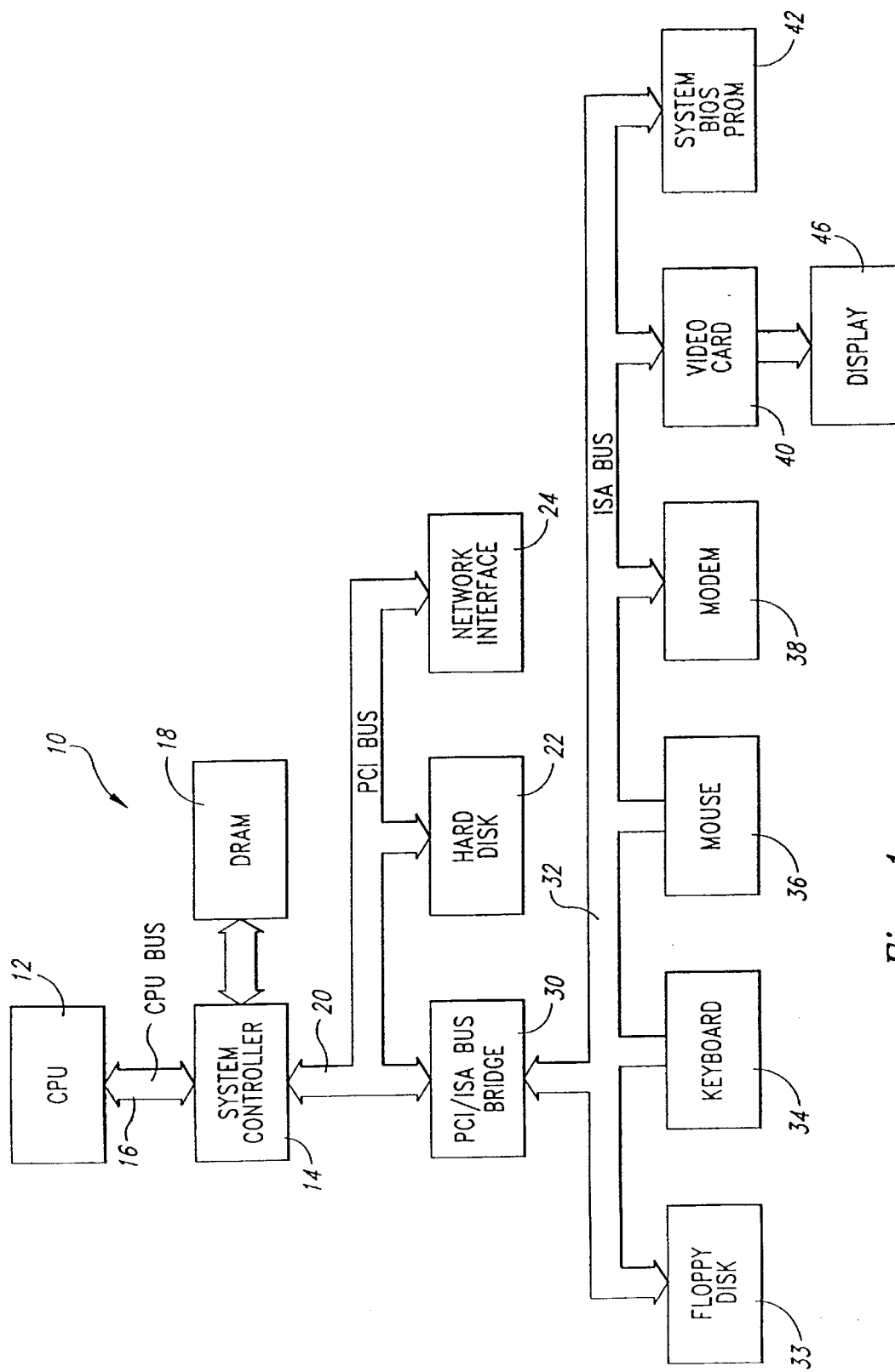
FIG. 1 is a block diagram of a conventional computer system.

A computer system 50 according to a preferred embodiment of the invention includes a daughterboard 52 that plugs into a motherboard 54 preferably in a conventional manner. The daughterboard 52 and motherboard 54 contain many components that are common to the prior art computer system 10 illustrated in FIG. 1. These common components have therefore been provided with the same reference numeral, and a description of the function and operation for some of these components may be omitted for purposes of brevity and clarity. Also, the daughterboard 52, as well as the motherboard 54, may contain a wide variety of other chip set components which are not shown or described herein for purposes of brevity.

The daughterboard 52 includes the CPU 12 connected to a DRAM 18 through a system controller 14. The system controller 14 also connects the CPU bus 16 to a PCI bus 60. The PCI bus 60 is connected to a programmable array logic ("PAL") device 62 which contains data identifying the specific CPU 12 or other hardware installed on the daughterboard 52. However, other devices, such as read-only memories (not shown), may be used instead of the PAL 62 to store the hardware data identifying the specific CPU 12 or other chip set components installed on the daughterboard 52.

The PCI bus 60 is also coupled to a PCI bus 70 on the motherboard 54. As in the computer system 10 of FIG. 1, the PCI bus 70 is coupled to a hard disk 22, a network interface device 24, and a PCI/ISA bus bridge 30. The ISA bus 72 is then coupled to the keyboard 34, mouse 36, modem 38, and a video card 40 in the same manner as in the conventional system 10 of FIG. 1. The video card 40 drives a conventional display 46. The ISA bus 72 is also connected to an electrically erasable programmable read-only memory ("EEPROM") 80 which stores the system BIOS program. The EEPROM 80 is preferably a conventional flash memory device, but other non-volatile memory devices may also be used. Also, although the memory device is preferably programmable, it need not be programmable, and it may store the BIOS programs written for several different CPUs 12 or other chip set components. However, since the daughterboard containing the CPU 12 and other chip set components is removable from the motherboard 54, there is no assurance that the BIOS program stored in the EEPROM 80 is of the type that is to be executed by the specific CPU 12 contained on the daughterboard 52 or to operate with a specific set of chip set components.

In accordance with the preferred embodiment of the invention, upon reset or power up of the CPU 12, the CPU 12 is operated in accordance with a startup routine that is also stored in the EEPROM 80 along with the BIOS program. However, it will be understood that the startup program could be stored in a memory device different from the EEPROM 80. The startup routine must be generic to all CPU's and other chip set components regardless of whether the correct BIOS program is stored in the EEPROM 80 since it must be executed by the CPU 12 to determine if the correct BIOS has been selected for execution by the CPU 12.

Figure 3:
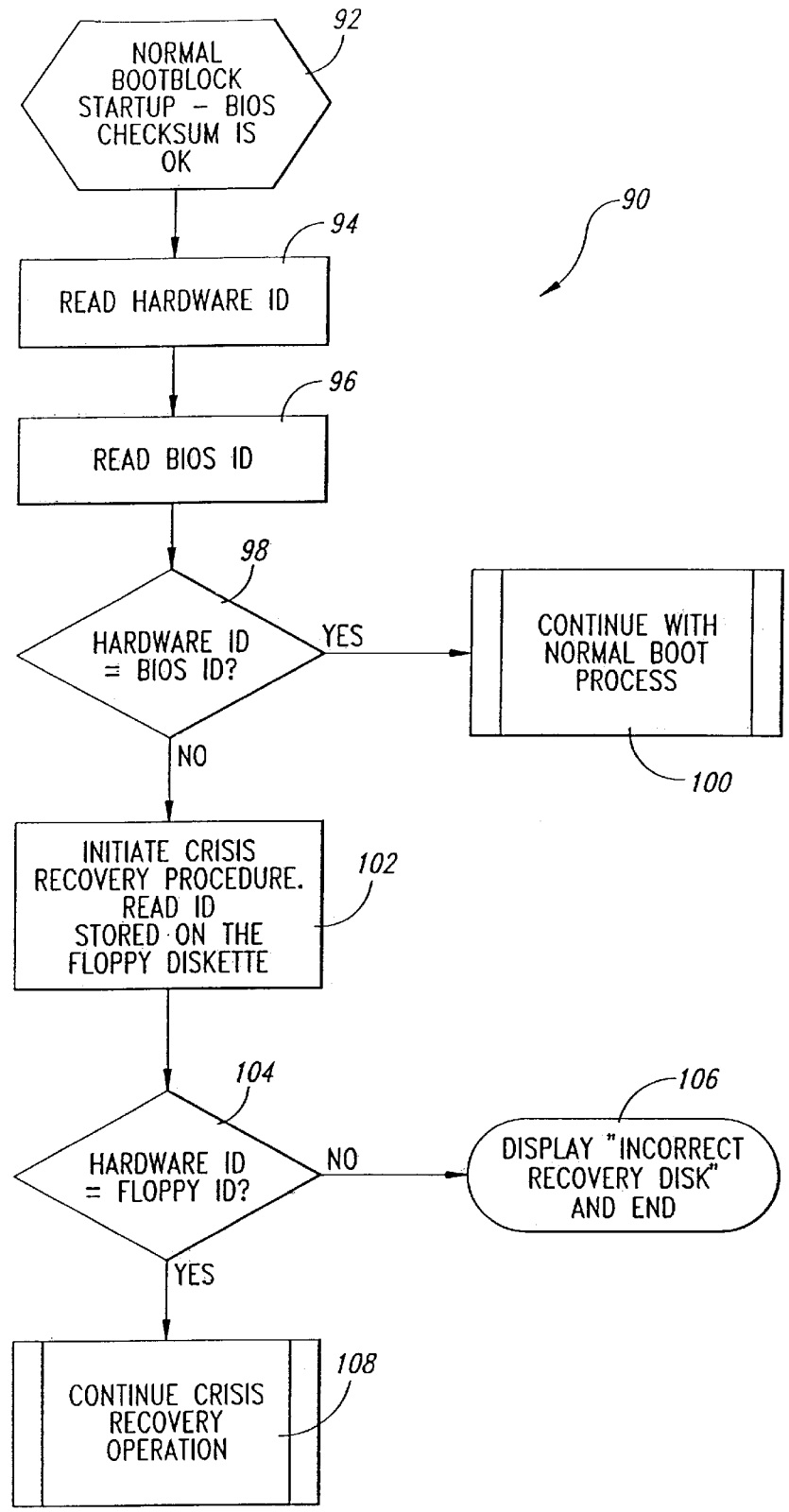
FIG. 3 is a flowchart showing one embodiment of a method of operating the computer system of FIG. 2.

The method of operating the computer system in accordance with the startup routine will now be explained with reference to the flowchart of FIG. 3. The method 90 is initiated at step 92 in which the CPU 12 executes a number of conventional power-on self tests, including a checksum test of the BIOS program stored in the EEPROM 80. CPU 12 then performs step 94 in which it reads the hardware identifying data from the PAL 62. Similarly, the CPU 12 reads data from the EEPROM 80 at step 96 in order to identify the BIOS program and determine which CPU is adapted to execute the BIOS program. A check is made at step 98 to determine if the hardware data and the BIOS identifying data correspond to the same CPU or other chip set components, i.e., the CPU 12 is able to execute the BIOS program stored in the EEPROM 80 or the chip set components are able to operate with the BIOS program stored in the EEPROM 80. If so, the CPU 12 continues with the normal boot process at step 100. If not, a crisis recovery procedure is performed at step 102. As is known in the art, in the crisis recovery routine, the user installs a disk containing the proper BIOS program on the floppy disk drive. The user may be prompted to install the disk by reading a message on the display 46, although it will be understood that the display 46 may not be operable because the BIOS program has not been executed. Under these circumstances, the user can be prompted by other means, such as by energizing a beeper (not shown) or flashing a light emitting diode ("LED") (not shown).

Figure 4:
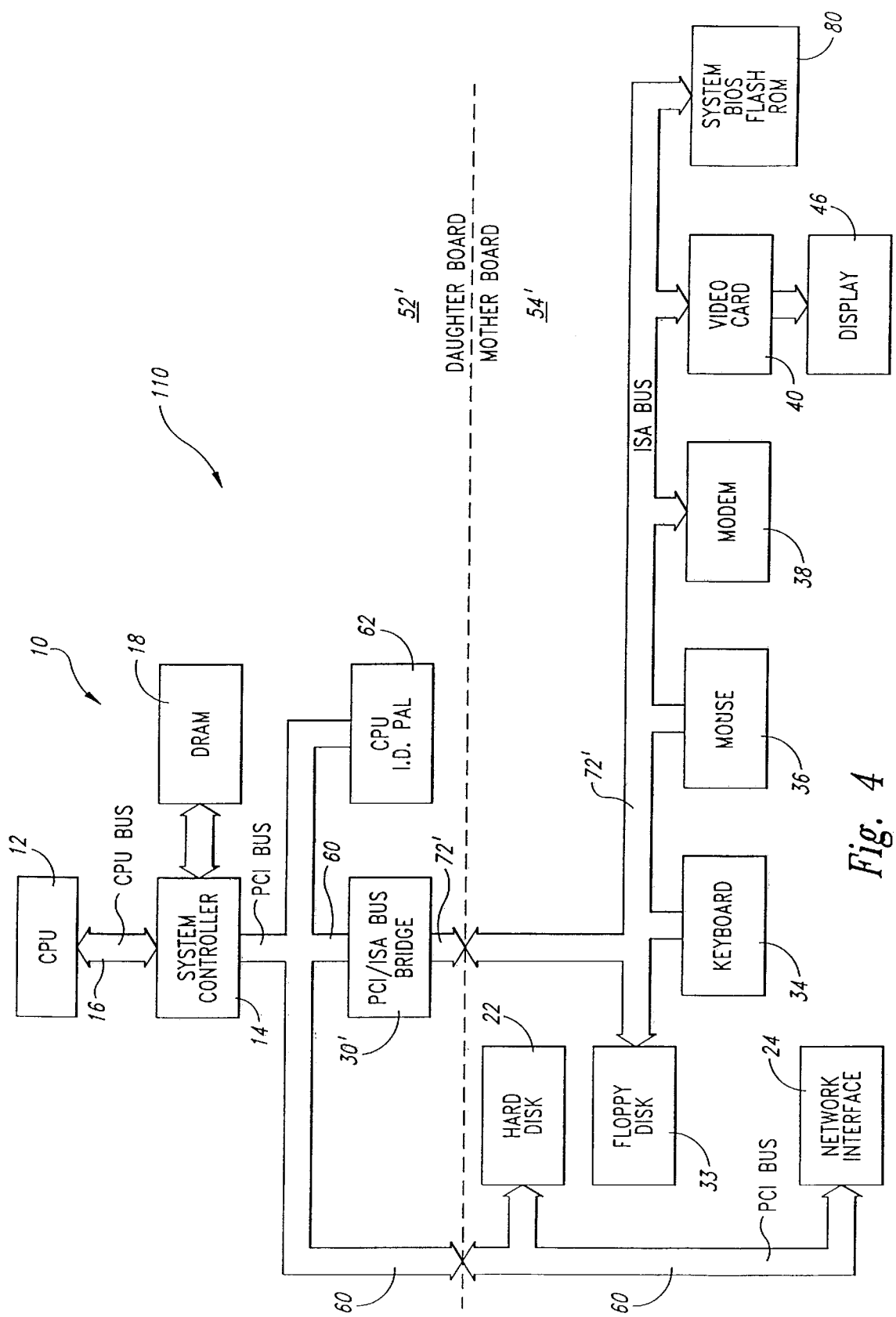
FIG. 4 is a block diagram of another computer system that may be operated in accordance with one embodiment of the inventive method.

With continued reference to FIG. 4, at step 104, the data identifying the CPU or other chip set components corresponding to the boot program on the floppy disk is read and compared to the hardware data from the PAL 62. If the floppy disk does not contain the correct BIOS program for the CPU 12 or other chip set components, an "Incorrect Recovery Disk" message is displayed on the display 46 at step 106. If the correct BIOS program is stored on the floppy disk, the normal crisis recovery operations are performed through step 108. These normal crisis recovery operations may, but not necessarily, include writing the proper BIOS program into the EEPROM 80. Thereafter, the CPU 12 can boot up in the normal fashion through steps 92–100 at power-on.

By operating the computer system 50 in accordance with one embodiment of the inventive method, the computer system 50 is able to accept daughterboards containing a variety of CPUs 12 and other chip set components. Further, the EEPROM 80 may contain several BIOS programs, each of which is specifically adapted to be executed by a respective CPU type or work with a specific set of chip set components. Instead of simply comparing the hardware data to the BIOS identifying data at step 98, the CPU 12 can select a BIOS program corresponding to a specific CPU or chip set, and the selected BIOS program is then used in the normal boot process at step 100. Thus, the computer system 50 is able to accept daughterboards containing a wide variety of CPUs 12 or other chip set components.

Figure 2:
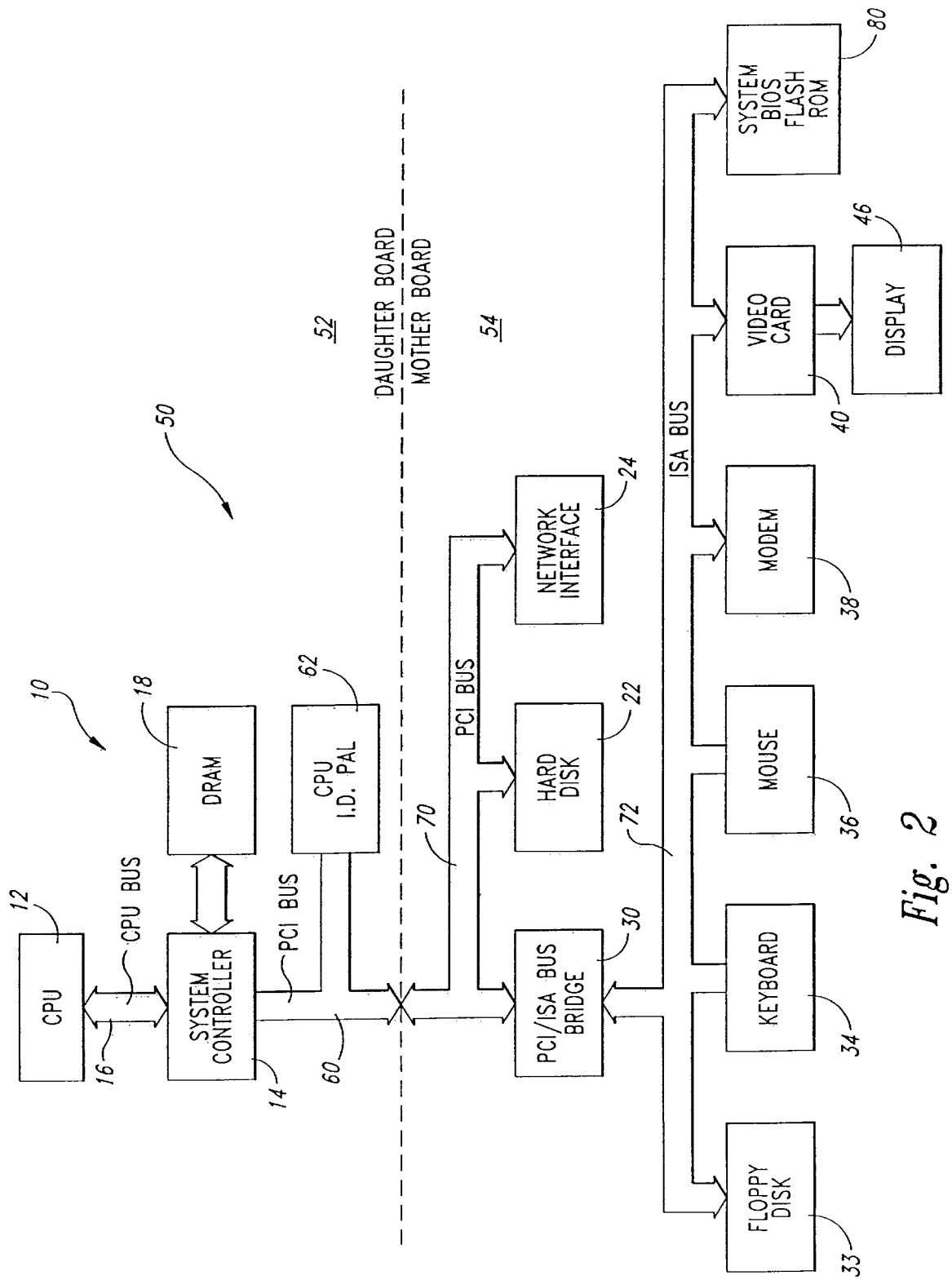
FIG. 2 is a block diagram of a computer system that may be operated in accordance with one embodiment of the inventive method.

An alternative embodiment of a computer system that may be operated in accordance with the inventive method is illustrated in FIG. 4. Most of the components of the system 110 illustrated in FIG. 4 are identical to the components of the computer system 50 illustrated in FIG. 2. These components have therefore been provided with the same reference numerals, and a description of their structure and operation will not be repeated in the interest of brevity and clarity. The computer system 110 shown in FIG. 4 differs from the computer system 50 of FIG. 2 by placing the PCI/ISA bus bridge 30 on the daughterboard 52' rather than on the motherboard 54'. Thus, in the embodiment illustrated in FIG. 4, the daughterboard 54' includes an ISA bus 72' as well as a PCI bus 60. Both the PCI bus 60 and the ISA bus 72' are then coupled to the motherboard 54. The PCI bus 60 and the ISA bus 72' are then coupled to the same components shown in FIG. 2 in the same manner.

From the foregoing it will be appreciated that, although specific embodiments of the invention have been described herein for purposes of illustration, various modifications may be made without deviating from the spirit and scope of the invention. For example, although the preferred embodiment of the inventive computer system is explained primarily as allowing a mother board to removably receive daughterboards containing CPU's or other chip set components, it will be understood that the invention is applicable to computer systems not having removable daughterboards. For example, a computer system could be configured differently for different customers or different applications, with hardware data stored in the PAL 62 identifying the customer or application. The preferred embodiment of the inventive computer system would then compare the hardware data to the BIOS identifying data stored in the EEPROM 80 to either verify that the correct BIOS program had been selected for execution by the CPU. If the correct BIOS program had not been selected, the CPU could either select a different BIOS program (if several were stored in the computer system) or execute a crisis recovery routine. These and other modifications of the preferred embodiment of the invention will be apparent to one skilled in the art. Accordingly, the invention is not limited except as by the appended claims.

What is claimed is:

1. A method of initializing a computer system having a motherboard including a memory device containing a basic input/output system ("BIOS") program and a daughterboard adapted to removably interface with the motherboard, the daughterboard including a central processing unit ("CPU") containing a memory; the method comprising:

determining if the BIOS program is for a hardware component of the type included on the daughterboard;

if the BIOS program is for a hardware component of the type included on the daughterboard, causing the CPU to execute the BIOS program; and if the BIOS program is not for a hardware component of the type included on the daughterboard, causing the CPU to execute a crisis recovery routine that allows loading of an alternative BIOS program.

2. The method of claim 1 wherein the hardware component comprises the CPU.

3. The method of claim 1 wherein the memory device contains a plurality of BIOS programs, and wherein the method further comprises:

determining if any of the BIOS programs is for a hardware component of the type included on the daughterboard;

if any of the BIOS programs is for a hardware component of the type included on the daughterboard, selecting the BIOS program for execution by the CPU;

causing the CPU to execute the selected BIOS program; and if none of the BIOS programs is for a hardware component of the type included on the daughterboard, causing the CPU to execute the crisis recovery routine.

4. A method of initializing a computer system having a chip set including a central processing unit ("CPU") and a memory device containing a basic input/output system ("BIOS") program, the method comprising:

determining if the BIOS program corresponds to at least one component of the chip set;

if the BIOS program corresponds to the at least one component of the chip set, causing the CPU to execute the BIOS program; and if the BIOS program does not corresponds to the at least one component of the chip set, causing the CPU to execute an additional routine that allows loading of an alternative BIOS program.

5. The method of claim 4 wherein the additional routine comprises a crisis recovery routine that prompts the user to enter an alternative BIOS program into the computer system for execution by the CPU.

6. The method of claim 4 wherein the component of the chip set corresponding to the BIOS program comprises the CPU.

7. The method of claim 4 wherein the memory device contains a plurality of BIOS programs, and wherein the additional routine comprises:

determining if any of the BIOS programs corresponds to at least one component of the chip set;

if any of the BIOS programs corresponds to at least one component of the chip set, selecting the BIOS program for execution by the CPU; and causing the CPU to execute the selected BIOS program.

8. The method of claim 4 further comprising:
if the BIOS program corresponds to at least one component of the chip set, causing the CPU to execute a crisis recovery routine.

9. A method of initializing a computer system having a first memory device containing a basic input/output system ("BIOS") program, a central processing unit ("CPU"), and a second memory device containing an operating system, the method comprising:
determining if the BIOS program is for the operating system stored in the second memory device;
if the BIOS program is for the operating system stored in the second memory device, causing the CPU to execute the BIOS program; and
if the BIOS program is not for the operating system stored in the second memory device, causing the CPU to execute a crisis recovery routine that allows loading of an alternative BIOS program.

10. The method of claim 9 wherein the first memory device contains a plurality of BIOS programs, and wherein the method further comprises:
determining if any of the BIOS programs is for the operating system stored in the second memory device;
if any of the BIOS programs is for the operating system stored in the second memory device, selecting the BIOS program for execution by the CPU;
causing the CPU to execute the selected BIOS program; and
if none of the BIOS programs is for the operating system stored in the second memory device, causing the CPU to execute the crisis recovery routine.

11. A method of initializing a computer system having a first memory device containing a basic input/output system ("BIOS") program, and a plurality of computer system hardware components, including a central processing unit ("CPU") and a system memory, the method comprising:
determining if the BIOS program is for at least a selected one of the hardware components included in the computer system;
if the BIOS program is for the at least one selected hardware component, causing the CPU to execute the BIOS program; and
if the BIOS program is not for the at least one selected hardware component, causing the CPU to execute a crises recovery routine that allows loading of an alternative BIOS program.

12. The method of claim 11 wherein the at least one selected hardware component comprises the CPU.

13. The method of claim 11 wherein the first memory device contains a plurality of BIOS programs, and wherein the method further comprises:
determining if any of the BIOS programs is for the at least one selected hardware component;
if any of the BIOS programs is for the at least one selected hardware component, selecting the BIOS program for execution by the CPU;
causing the CPU to execute the selected BIOS program; and the at least one selected hardware component if none of the BIOS programs is for the at least one selected hardware component, causing the CPU to execute the crisis recovery routine.

* * * * *

UNITED STATES PATENT AND TRADEMARK OFFICE
CERTIFICATE OF CORRECTION

PATENT NO. : 6,161,177
DATED : December 12, 2000
INVENTOR(S) : Eric D. Anderson

It is certified that error appears in the above-identified patent and that said Letters Patent is hereby corrected as shown below:

Title page,
Item [63], Related U.S. Application Data, "Continuation" should read -- Divisional --

Column 1,
Line 8, "continuation" should read -- divisional --

Column 6,
Line 48, "does not corresponds to" should read -- does not correspond to --

Signed and Sealed this

Second Day of April, 2002

*Attest:*

JAMES E. ROGAN
*Attesting Officer*     *Director of the United States Patent and Trademark Office*